United States Patent [19]

Palmer et al.

[11] Patent Number: 5,246,980
[45] Date of Patent: Sep. 21, 1993

[54] TWO-PART, ULTRALOW MODULUS SILICONE SEALANT

[75] Inventors: Richard A. Palmer; Sherwood Spells, both of Midland, Mich.

[73] Assignee: Dow Corning Corporation, Midland, Mich.

[21] Appl. No.: 908,106

[22] Filed: Jul. 2, 1992

[51] Int. Cl.$^5$ ............................................. C08K 9/00
[52] U.S. Cl. .................................. 523/200; 523/205; 523/216; 528/33; 528/34; 528/901
[58] Field of Search ..................... 528/33, 34, 901; 523/200, 205, 216

[56] References Cited

U.S. PATENT DOCUMENTS

| | | | |
|---|---|---|---|
| 3,817,909 | 6/1974 | Toporcer et al. | 260/37 SB |
| 3,996,184 | 12/1976 | Klosowski | 260/32.6 R |
| 4,508,888 | 4/1985 | Letoffe et al. | 528/23 |
| 4,978,706 | 12/1990 | Dietlein et al. | 524/423 |

FOREIGN PATENT DOCUMENTS 1308985  3/1973  United Kingdom .

*Primary Examiner*—Melvyn I. Marquis
*Attorney, Agent, or Firm*—Edward C. Elliott; William F. Boley

[57] ABSTRACT

A two part sealant cures rapidly in deep sections when the two parts are mixed together. A first part comprises a hydroxyl endblocked polydiorganosiloxane, non-reinforcing, non-acidic filler, diacetamidosilane chain extender of the general formula $$(CH_2=CH)(CH_3)Si(\overset{R'}{\underset{|}{N}}-\overset{O}{\underset{\|}{C}}CH_3)_2,$$

and aminoxysilicone compound having from 1 to 100 silicone atoms per molecule and from 3 to 10 aminoxy groups per molecule. A second part comprises a hydroxyl endblocked polydiorganosiloxane, non-reinforcing, non-acidic filler, and hydroxyl endblocked polydiorganosiloxane having a degree of substitution of from about 1 to 50. When mixed together, the two parts cure rapidly in deep sections.

11 Claims, No Drawings

TWO-PART, ULTRALOW MODULUS SILICONE SEALANT

BACKGROUND OF THE INVENTION

1. Field of the Invention

This invention relates to a two part silicone sealant which cures upon mixing of the two parts to give an ultra low modulus elastomeric sealant.

2. Background Information

British Patent Specification 1,308,985, published Mar. 7, 1983, discloses a method of curing room temperature vulcanizing silicone rubber containing acetoxy-silicon bonds, which method adds sodium alumino silicate having adsorbed water. The water from the aluminosilicate causes the silicone rubber to cure even if the composition is not open to atmospheric moisture.

A silicone composition which cures upon exposure to moisture in the air is described in U.S. Pat. No. 3,817,909, issued Jun. 18, 1974. This composition is obtained by mixing a hydroxyl endblocked polydiorganosiloxane, non-acidic, non-reinforcing filler, a difunctional acetamidosilane, and an aminoxysilicon compound.

A low modulus room temperature vulcanizable silicone elastomer with improved slump characteristics is taught in U.S. Pat. No. 3,996,184, issued Dec. 7, 1976. The composition contains hydroxyl endblocked polydimethylsiloxane, non-acidic, non-reinforcing filler, methylvinyldiacetamidosilane, aminoxysilicon compound, and a selected polar solvent. The sealants are useful in sealing joints wherein the building materials sealed by the material can expand and contract without breaking the seal.

An organopolysiloxane composition which rapidly hardens to the elastomeric state is disclosed in U.S. Pat. No. 4,508,888, issued Apr. 2, 1985. The composition comprises a polyhydroxylated polysiloxane, a polyacyloxysilane cross-linking agent, and a hardening accelerator comprising water and an alkali or alkaline earth metal phosphate and/or polyphosphate.

A silicone sealant having an improved skinover time is taught in U.S. Pat. No. 4,978,706, issued Dec. 18, 1990. The composition consists essentially of hydroxyl containing polydiorganosiloxane, diacetamido functional silane, and tetraoximino functional silane. The composition can also contain non-acidic, non-reinforcing filler.

Typical one-part silicone sealant formulations cure by the reaction of moisture in the air. The curing process starts at the surface and gradually proceeds inward. The time required to reach full cure varies from a few days to several weeks, depending upon the system. Typically, all one-part systems are packaged to minimize exposure to atmospheric moisture as this will result in premature curing. In some instances, excess reactive groups are added to react with incoming moisture, but still produce a curable one-part formulation. This invention describes how the introduction of controlled amounts of reactive hydroxyl groups, without catalyst, can take advantage of any excess reactive groups to prepare a two-part formulation that, when the two parts are mixed, rapidly cures to an ultra-low modulus silicone sealant without the need for moisture from the atmosphere.

SUMMARY OF THE INVENTION

A two-part, ultra-low modulus sealant, containing no catalyst, has been developed which cures rapidly in deep sections when the two parts are mixed. Part 1 comprises a hydroxyl endblocked polydiorganosiloxane, filler, diacetamidosilane chain extender, and aminoxy functional crosslinker. These ingredients react when mixed to give a polydiorganosiloxane end-capped with an excess mixture of hydrolyzable acetamidosilane chain extender and aminoxy functional crosslinker. Part 2 comprises hydroxyl endblocked polydiorganosiloxane, filler, and hydroxyl endblocked polydiorganosiloxane having a degree of polymerization of from about 1 to 50. Parts 1 and 2 are preferably proportioned so that when they are mixed in a 1:1 ratio by weight, there is from 1.1 to 3.4 moles of hydrolyzable groups in part 1 to each mole of —OH groups in part 2.

DESCRIPTION OF THE INVENTION

This invention relates to a two-part composition which is stable on storage as two parts and curable at room temperature, upon mixing of the two parts, to yield a silicone elastomer, the composition comprising Part 1, comprising a product obtained by mixing under anhydrous conditions (A) 100 parts by weight of a hydroxyl endblocked polydiorganosiloxane having a viscosity at 25° C. of from 5 to 100 Pa.s and in which the organic groups are selected from the group consisting of methyl, ethyl, vinyl, phenyl, and 3,3,3-trifluoropropyl radicals, in said polydiorganosiloxane no more than 50 percent of the organic groups being phenyl or 3,3,3-trifluoropropyl radicals and no more than 10 percent of the organic groups being vinyl radicals; (B) from 25 to 150 parts by weight of non-acidic, non reinforcing filler; (C) from 2.5 to 10 parts by weight of a silane of the general formula

in which R' is an organic radical selected from the group consisting of methyl, ethyl, and phenyl, said silane being present in an amount sufficient to provide at least one silane molecule per hydroxyl of the polydiorganosiloxane; (D) from 1 to 6 parts by weight of an aminoxysilicone compound having from 1 to 100 silicon atoms per molecule and from 3 to 10 aminoxy groups per molecule, said aminoxy group having a general formula —OX in which X is a monovalent amine radical selected from the group consisting of —NR$_2$ and a heterocyclic amine, R is a monovalent hydrocarbon radical, the —OX group being bonded to silicon through the SiO bond, the remaining valences of the silicon atoms in the aminoxysilicone compound being satisfied by divalent oxygen atoms which link the silicon atoms of the aminoxysilicone compounds having two or more silicon atoms per molecule through silicon-oxygen-silicon bonds and by monovalent hydrocarbon radicals and halogenated monovalent hydrocarbon radicals bonded to the silicon atoms through silicon-carbon bonds, there being an average of at least one monovalent hydrocarbon radical or halogenated monovalent hydrocarbon radical per silicon atom; (E) from 0 to 20 percent by weight of a diluent consisting of non-reactive silicone fluid having a viscosity of from 1 to 100 Pa.s at 25° C.; and Part 2, comprising a product obtained by mixing (F) 100 parts of (A); (G) from 25 to 150 parts of (B); (H) from 0 to 20 percent of (E); and (I) sufficient hydroxyl radical endblocked polydiorganosiloxane of the formula

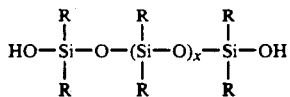

where R is a substituted or unsubstituted monovalent hydrocarbon radical of 1 to 6 carbon atoms and x is from 1 to 50; to give from 1.1 to 3.4 moles of hydrolyzable groups in part 1 to each mole of hydroxyl groups in part 2, and when part 1 and part 2 are combined said silane (C) and said aminoxysilicone compound (D) being present in amounts sufficient to provide a combined weight of at least 5 parts by weight per 100 parts by weight of (A), and said aminoxysilicone compound (D) being present in an amount by weight which is not greater than the weight of silane (C), said composition curing to a non-flowing gel in less than 3 hours at a temperature of 25° C.

This invention controls the amounts of reactive hydroxyl groups to take advantage of excess reactive groups of (C) and (D) to prepare a two-part formulation that, when the two parts are mixed, rapidly cures to an ultra-low modulus silicone sealant without the need for moisture from the atmosphere. To simplify end-use applications, it is highly desirable to have a 1 to 1 mix of Part 1 and Part 2 by volume. But the rate of sealant cure is controlled by the ratio of excess moles of amide/aminoxy groups in Part 1 to the moles of hydroxyl groups in Part 2. There is a minimum number of hydroxyl that must be present in Part 2 to achieve rapid cure. Below that minimum amount, slow cure will result from moisture in the atmosphere as occurs with one part sealant compositions.

This minimum number of hydroxyl is controlled by the polymer molecular weight; the higher the molecular weight, the lower will by the hydroxyl content. As the molecular weight of the hydroxyl source increases, the more difficult it is to maintain the 1:1 volume mix ratio. Thus, the number of hydroxyls per unit volume in Part 2 should be as high as possible to maintain the 1:1 mix volume.

The molar ratios found most useful to obtain this rapid curing material (i.e. 35 percent of ultimate properties in less than 24 hours) vary with the hydroxyl source. For hydroxyl terminated polysiloxane polymers (I) (i.e. molecular weight<2250, viscosity about 0.06 Pa.s) the molar ratio of reactive groups in Part 1 to Part 2 varies between 1.1 and 3.4. If water was used as the hydroxyl source, the molar ratio of hydrolyzable groups in Part 1 to hydroxyl groups in Part 2 would vary between 0.5 and 2.1. For water and siloxane polymer, above these limits of 2.1 and 3.4 respectively, the amount of hydrolyzable groups become excessive and the cure rate simulates that of 1-part formulations. Below the 0.5 ratio for water (increasing the water content in Part 2), the tendency for water separation is increased and generally requires re-mixing prior to use. For siloxanes, going below the 1.1 ratio (increasing the siloxane content in Part 2) generally shows lowering of adhesion and increase in surface tackiness. Using polymers with higher molecular weights will require changing the 1:1 volumetric mixing ratio. The amounts of ingredients specified in the claims are by weight as this is the most understandable method, but frequently the equipment used to mix two part sealants is most easily controlled by volume, so this conversion of the parts by weight to parts by volume must be made in the calculation of the amount of the different ingredients to use.

The composition of this invention is a two part system; that is, the ingredients of the curable composition are made and stored in two parts. The two parts are shelf stable, although part 1 must be stored in the absence of moisture. When the two parts are combined, they make a composition which cures at room temperature. The composition cures rapidly and completely throughout. The composition is particularly useful in applications where a sealant is needed which is confined or mostly confined so that its contact with atmospheric moisture is limited and the cure throughout the sealant must be rapid, in the order of 1 or 2 hours. One use for the composition is in sealing joints which are subject to movement during cure. There are applications in which a joint must be sealed, but the joint may move during the normal curing time. Expansion joints in buildings and bridges are an example where such a need arises. The temperature of the structures can change during the day, causing the space in the expansion joint to change fairly rapidly. If a sealant is applied in such a joint, it has been found that the expansion or contraction of the joint during the time at which the sealant is curing will cause the curing sealant to rupture. A normal sealant cures upon exposure to the moisture in the atmosphere, curing from the surface exposed to the air downward into the bulk of the joint, the time to reach full cure varying from a few days to several weeks. Under such circumstances, if the joint moves during the curing process, the sealant can rupture. The composition of this invention cures throughout after mixing the two parts at a rapid rate and is useful in such situations.

The composition is presented as two parts. The composition has certain requirements as to amounts of ingredients which are used in order to obtain the desired cure rates and cured sealant properties. The two parts of the composition are presented in ratios so that the use of equal weights of the two parts gives the correct amounts of the ingredients. It is possible of course to use different amounts of the ingredients in each of the two parts and different ratios of the two parts to obtain the same final composition. The preferred compositions are for the 1 to 1 ratio of parts 1 and 2 with the understanding that other ratios are also useful and easily determined by one skilled in the art.

The hydroxyl endblocked polydiorganosiloxanes (A) can have a viscosity at 25° C. of from about 5 to 100 Pa.s, preferably from 40 to 60 Pa.s. These polydiorganosiloxanes can be monodispersed, polydispersed, or blends of varying viscosities as long as the average viscosity falls within the limits defined above. The hydroxyl endblocked polydiorganosiloxanes have organic groups selected from methyl, ethyl, vinyl, phenyl and 3.3.3-trifluoropropyl radicals. The organic groups of the polydiorganosiloxane contain no more than 50 percent phenyl or 3,3,3-trifluoropropyl radicals and no more than 10 percent vinyl radicals based upon the total number of radicals in the polydiorganosiloxane. Other monovalent hydrocarbon radicals and halogenated monovalent hydrocarbon radicals in small amounts can be present in the polydiorganosiloxane. The diorganosiloxane units of the hydroxyl endblocked polydiorganosiloxane can be, for example, dimethylsiloxane, diethylsiloxane, ethylmethylsiloxane, diphenylsiloxane, methylphenylsiloxane, methylvinylsiloxane, and 3,3,3-trifluoropropylmethylsiloxane. The term polydiorganosiloxane as used herein does not preclude small amounts of other siloxane units such as monoorganosiloxane units which may be present as an impurity of the manufacturing process. The hydroxyl endblocked polydiorganosiloxanes are known in the art and can be made by known commercial methods. The preferred hydroxyl endblocked polydiorganosiloxane is hydroxyl endblocked polydimethylsiloxane.

The compositions of this invention contain from 25 to 125 parts by weight of non-acidic, non-reinforcing filler having an average particle size of from 1 to 8 micrometers per 100 parts by weight of hydroxyl endblocked polydiorganosiloxane. The filler is present as treated filler, having been treated with a treating agent selected from the group consisting of calcium stearate, stearic acid, salts of stearic acid, and carboxylatepolybutadiene. The fillers are non-acidic, non-reinforcing filler and include for example, calcium carbonate, ferric oxide, diatomacious earth, alumina, hydrated alumina, titanium dioxide, organic fillers, resins such as silicone resins, crushed quartz, calcium sulfate, and the like.

The filler is treated with the treating agent by either coating or reacting the filler with the treating agent. Treated fillers are commercially available, such as the calcium stearate treated calcium carbonate filler that is known as CS-11 from Georgia Marble Company of Tate, Ga., and the Kotamite from Cyprus Industrial Minerals Company of Englewood, Colo. The filler is required to be treated because treated filler gives a higher flow to the uncured composition and a lower modulus to the cured composition. These treated fillers normally contain a small amount of absorbed water, which must be considered in the determination of the necessary amounts and ratios of ingredients used in order to obtain the most effective cure and cure rate.

The silane (C) of the general formula

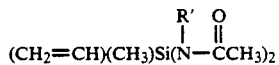

reacts with the hydroxyl endblocked polydiorganosiloxane to give a longer polymer. The longer polymer gives a lower modulus material that is advantageous for this type of application. In the formula R' represents an organic radical of the group methyl, ethyl and phenyl. The silanes include, for example, methylvinyldi-(N-methylacetamido)silane, and methylvinyldi-(N-phenylacetamido)silane. A preferred silane (C) is methylvinyldi-(N-methylacetamido)silane. These amidosilanes can be prepared by reacting a chlorosilane with an alkali metal salt of an appropriate N-organoacetamide. This method is further detailed in U.S. Pat. No. 3,776,933, issued Dec. 4, 1973 by Toporcer and Crossan, and hereby incorporated by reference for the preparation of the amidosilanes.

The amidosilanes can be prepared as by the following illustration: mixing a sodium salt of N-methylacetamide with methylvinyldichlorosilane in an inert organic solvent such as toluene, filtering the by-produced sodium chloride from the toluene-product solution, and thereafter removing the toluene by vacuum distillation to obtain the product, methylvinyldi(N-methylacetamido)silane.

The aminoxysilicone compounds (D) are silicon compounds having from 1 to 100 silicon atoms per molecule in which there are from 3 to 10 aminoxy groups per molecule. The aminoxysilicone compounds can be prepared by the method shown in U.S. Pat. No. 3,441,583, issued Apr. 29, 1969, which also illustrates many aminoxysilicone compounds. The aminoxy silicon compounds include silanes and siloxanes. The aminoxy group which is bonded to the silicon atoms through silicon-oxygen bonds can be represented by the general formula —OX wherein X is a monovalent amine radical of the group —NR$_2$ and heterocyclic amine. R represents a monovalent hydrocarbon radical. The —NR$_2$ groups can be represented by N,N-diethylamino, N,N-ethylmethylamino, N,N-dimethylamino, N,N-diisopropylamino, N,N,-dipropylamino, N,N,-dibutylamino, N,N,-dipentylamino, N,N,-dihexylamino N,N,-dibutylamino, N,N-methylpropylamino, N,N,-diphenylamino, and N,N,-methylphenylamino. The heterocyclic amines can be illustrated by ethyleneimino, pyrrolidino, piperidino, and morpholino. Additional aminoxysilicone compounds can be found in U.S. Pat. No. 3,996,184, issued Dec. 7, 1976, which is hereby incorporated by reference to show aminoxysilicone compounds. A preferred aminoxysilicone compound is a copolymer having per molecule an average of two trimethylsiloxane units, five methyl(N,N-diethylaminoxy)siloxane units and three dimethylsiloxane units.

The amount of amidosilane (C) can be from 2.5 to 10 parts by weight per 100 parts by weight of polydiorganosiloxane (A). The most preferred compositions have from 4 to 8 parts by weight. When the amount of amidosilane is less than 2.5 parts, the resulting composition cures to a silicone elastomer with sufficiently higher modulus so that it would no longer be classified as a low modulus silicone elastomer. No advantages are experienced in exceeding 10 parts by weight because slower cures and less desirable physical properties are observed.

The amount of aminoxysilicone compound (D) can be from 1 to 6 parts by weight per 100 parts by weight of hydroxyl endblocked polydiorganosiloxane. The preferred amount of aminoxysilicone compound is dependent to some extent upon the viscosity of the hydroxyl endblocked polydiorganosiloxane. The larger amounts of aminoxysilicone compound are preferably used with the higher viscosity polydiorganosiloxane. If the amount of aminoxysilicone compound exceeds 6 parts, the resulting cured products are high modulus silicone elastomers. The preferred amount of aminoxysilicone compound is from 2 to 4 parts. However, the amount of aminoxysilicone compound regardless of viscosity should not exceed the weight of the amidosilane (C) and the combined weight of amidosilane (C) and aminoxysilicone compound (D) should be at least 5 parts. Amounts of aminoxysilicone compound exceeding the weight of silane (C) result in cured products having high modulus.

The composition of part 1 can be packaged with all the reactive ingredients in one package and stored over extended periods of time under anhydrous condition, such as for three months or more. The composition of part 1 will cure if exposed to moisture. The composition of part 2 will not cure on exposure to moisture so it does not have to be prepared or stored under anhydrous conditions.

The composition of this invention includes from 0 to 20 percent by weight of the total composition of a diluent (E) consisting of non-reactive silicone fluid having a viscosity of from 1 to 100 Pa.s at 25° C. The non-reactive silicone fluid can be a homopolymer of R"$_2$SiO units where R" is methyl, ethyl, propyl, vinyl, or 3,3,3,trifluoropropyl, and R" can be the same or different in each unit. The end blocking unit of the silicone diluent can be R"$_3$SiO where R" is as described above. The diluent is used to give a lower modulus and a higher elongation than can be achieved without the diluent. If the viscosity of the diluent is too low, the composition does not cure properly, that is, the tack free time becomes excessive. The diluent having a higher viscosity, 12 Pa.s and above for example, appear to give a shorter tack free time than the lower viscosity material. The amount of diluent required is less for the higher viscosity material than for the lower viscosity. The preferred diluent is a trimethylsilyl endblocked polydimethylsiloxane having a viscosity of about 12.5 Pa.s at 25° C.

Part 2 consists essentially of (F) 100 parts of (A) the polydiorganosiloxane, (G) from 25 to 150 part of (B) the filler, (H) from 0 to 20 percent of the weight of the combination of part 1 and part 2 of (E) the diluent, and (I) sufficient hydroxyl radical endblocked polydiorganosiloxane of the formula

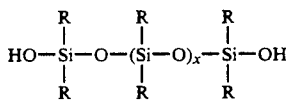

where R is a substituted or unsubstituted monovalent hydrocarbon radical of 1 to 6 carbon atoms and x is from 1 to 50, to give from 1.1 to 3.4 moles of hydrolyzable groups in part 1 to each mole of hydroxyl groups in part 2. R is preferably methyl radical as such materials are readily available. The viscosity of the polydiorganosiloxane is less than about 0.06 Pa.s (60 centipoise). Preferred are hydroxyl endblocked polydimethylsiloxanes having from 5 to 35 dimethylsiloxy groups per molecule.

The compositions are preferably made by mixing the hydroxyl endblocked polydiorganosiloxane and filler to make a homogeneous mixture with the filler well dispersed. A suitable mixture can usually be obtained in one hour using commercial mixers. The resulting mixture is preferably deaired and then, in the case of part 1, a mixture of the amidosilane and aminoxysilicone compound is added and mixed with the polymer and filler mixture. This mixing is done under essentially anhydrous conditions. Then the resulting part 1 composition is put into containers for storage under essentially anhydrous conditions. The hydrolyzable groups of part 1 are those remaining after the mixing of the ingredients of part 1. This amount can be calculated by subtracting the amounts reacted with the hydroxyl from (A) and the adsorbed water from (B) from the hydrolyzable groups of (C) and (D). The part 1 compositions are stable; that is they do not cure, if the essentially moisture free conditions are maintained, but will cure to low modulus silicone elastomers when exposed to moisture at room temperature. The diluent can be mixed into the composition in any manner and at any time during the preparation, but it is preferred to add it after the polymer and filler have been mixed as a better filler dispersion takes place. The compositions of the present invention do not require a catalyst to aid in curing the composition and it is observed that many of the conventional curing catalysts used in room temperature vulcanizable silicone elastomer compositions are detrimental to the curing of the compositions.

Part 2 of the composition does not contain a curing system for the polydiorganosiloxane (A), so it is not necessary to have anhydrous mixing or storage conditions.

Either part 1 or part 2 can contain the normal additives such as pigments, heat stability additives, etc. as long as they do not interfer with the curing and development of the desired physical properties.

The following examples are included for illustrative purposes only and should not be construed as limiting the invention which is properly set forth in the appended claims.

COMPARATIVE EXAMPLE

A part 1 was prepared by mixing 100 parts of hydroxyl endblocked polydimethylsiloxane fluid (PDMS) having a viscosity of about 50 Pa.s at 25° C. and a hydroxyl content of about 0.05 weight percent (molecular weight about 62,000, degree of polymerization (DP) of about 840), 80 parts of calcium stearate treated calcium carbonate filler having an average particle diameter of about 3 micrometers and about 0.04 percent absorbed water content, and 0.7 parts of carbon black pigment paste. This mixture was deaired and then, mixing under anhydrous conditions, 5.9 parts of chain extender consisting of about 80 percent by weight of methylvinyl-di(N-methylacetamido)silane with the remaining 20 percent being impurities consisting primarily of methyl-N-methylacatamide, di(methylvinyl-N-acetamido)methylvinylsilane, and xylene; 3.4 parts of aminoxy-functional crosslinker, N,N-diethylaminoxypolysiloxane, of the formula

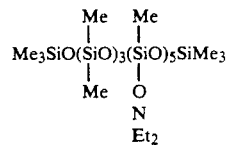

where Me is methyl and Et is ethyl; and 22.5 parts of trimethylsilyl endblocked polydimethylsiloxane having a viscosity of about 12.5 Pa.s at 25° C. were mixed until uniform and then placed into a container for storage under anhydrous conditions.

Calculations on the above first part to determine the amounts of reactive ingredients present show that 100 g of part 1 contains:

| ingredient | Moles | Moles of Fun. Grp. | Functional Group |
| --- | --- | --- | --- |
| PDMS | 0.00076 | 0.00152 | —OH |
| water* | 0.00083 | 0.00167 | —OH |
| chain extender | 0.01308 | 0.02618 | hydrolyzable |
| crosslinker | 0.00143 | 0.00715 | hydrolyzable |

*from filler

There was a total of 0.0333 hydrolyzable moles and 0.00319 moles of —OH, giving an excess of hydrolyzable groups of 0.03011 moles for each 100 g of part 1.

A part 2 was prepared by mixing 100 parts of the hydroxyl endblocked polydimethylsiloxane, 79 parts of the calcium carbonate filler, and 22 parts of the trimethylsilyl endblocked polydimethylsiloxane. This second part was then placed in a container for storage until use.

Calculations on the above part 2 to determine the amounts of reactive —OH present show that 100 g of part 2 contains:

| ingredient | Moles | Moles of Fun. Grp. | Functional Group |
|---|---|---|---|
| PDMS | 0.00076 | 0.00152 | —OH |
| water* | 0.00083 | 0.00167 | —OH |

*from filler

There was a total of 0.00319 moles of —OH in each 100 g of part 2.

A series of compositions were prepared and tested for cure rate by mixing the above part 1 and part 2 together in various ratios as shown in Table I and placing them into 1 inch deep cups. After 3 hours cure time at 25° C. the cure of the sample was determined with the result as shown in Table I.

TABLE I

| Part 1 parts | Part 2 parts | Chain Extender parts | Crosslinker parts | Cure Condition |
|---|---|---|---|---|
| 1 | 10 | 0.52 | 0.30 | little surface cure* |
| 1 | 7 | 0.72 | 0.41 | no cure* |
| 1 | 5 | 0.96 | 0.55 | gelled to 1 inch depth |
| 1 | 5 | 0.96 | 0.55 | partial gell in depth |
| 1 | 3 | 1.44 | 0.82 | gelled to 1 inch depth |
| 1 | 1 | 2.92 | 1.67 | 3/16 inch surface cure |
| 5 | 1 | 4.92 | 2.82 | ⅛ inch surface cure |
| 10 | 1 | 5.39 | 3.08 | <1/16 inch surface cure |

*did not cure due to lack of crosslinker

The ratio of moles of hydrolyzable group from the first part and the —OH from both the first part and the second part in each of the above mixtures is:

| Part 1 parts | Part 2 parts | Functional moles | —OH moles | Ratio Fun./—OH |
|---|---|---|---|---|
| 1 | 10 | 0.0333 | 0.0367 | 0.909 |
| 1 | 7 | 0.0333 | 0.0266 | 1.252 |
| 1 | 5 | 0.0333 | 0.0199 | 1.673 |
| 1 | 5 | 0.0333 | 0.0199 | 1.673 |
| 1 | 3 | 0.0333 | 0.0132 | 2.519 |
| 1 | 1 | 0.0333 | 0.0065 | 5.098 |
| 5 | 1 | 0.1666 | 0.0193 | 8.636 |
| 10 | 1 | 0.3332 | 0.0352 | 9.457 |

This shows that in order for such a composition to cure properly upon mixing, the ratio of hydrolyzable groups to —OH must be in the range of 1.1 to 3.4.

EXAMPLE 1

A series of part 2s were prepared by mixing together 100 parts by weight of the PDMS of the comparative example, 79 parts of the filler and 22 parts of the nonreactive fluid. This base was then mixed with a hydroxyl endblocked polydimethylsiloxane fluid, having a hydroxyl content of 4 percent and a DP of about 8, in the amounts shown in Table II. These compositions were then mixed with the first part composition in a 1:1 ratio by weight and poured into 25 mm (1 in.) deep cups and the cure conditions determined after 24 hours with the results as shown in Table II.

TABLE II

| parts fluid | cure | |
|---|---|---|
| 11 | tacky surface, | 25 mm depth cure |
| 8 | sl. tacky | 25 mm depth cure |
| 5 | dry surface | 25 mm depth cure |
| 2.5 | dry surface | partial cure to gel |

The ratio of moles of hydrolyzable group from the first part and the —OH from both the first part and the second part in each of the above mixtures is:

| Parts fluid | Functional moles | —OH moles | Ratio Fun./—OH |
|---|---|---|---|
| 2.5 | 0.0333 | 0.0088 | 3.767 |
| 5 | 0.0333 | 0.0143 | 2.322 |
| 8 | 0.0333 | 0.0203 | 1.641 |
| 11 | 0.0333 | 0.0260 | 1.280 |

Additional second parts were prepared by mixing 100 parts of the above base with 10, 5, and 2.5 parts of the hydroxyl endblocked fluid having a DP of 8. This material was mixed in a 1:1 weight ratio with the above part 1 and used to form tensile-adhesion joints as described in ASTM C 719. Mortar blocks of 25×25×75 mm (1×1×3 inch) were used to form a joint of 50.8 mm (2 inch) length with a width and depth of 12.7 mm (½ inch) by separating the two pieces with Teflon spacers 12.7 by 12.7 by 25.4 mm, leaving a void space of 50 mm by 25.4 mm by 12.7 mm. A 50 mm long piece of 12.7 mm diameter closed cell back-up material was placed in the bottom of this space, leaving a void of 12.7 mm by 12.7 mm by 20 mm (1 square inch). The samples of sealant were then extruded into this space. Three replicate samples were prepared. After cure times of 1 day and 7 days the samples were pulled apart at a rate of 50 mm per minute and a measurement of the strain at 50 percent, 100 percent, and 300 percent was obtained. Tensile strength and elongation at break were measured. The results of these tests are shown in Table III.

TABLE III

| parts fluid | Cure days | Modulus 50% kPa | Modulus 100% kPa | Modulus 300% kPa | Tensile Strength kPa | Elongation percent |
|---|---|---|---|---|---|---|
| 2.5 | 1 | 16 | 14 | 12 | 21 | 2150 |
| | 7 | 34 | 38 | 44 | 91 | 1540 |
| 5.0 | 1 | 24 | 25 | 27 | 61 | 2010 |
| | 7 | 40 | 43 | 52 | 115 | 1570 |
| 10.0 | 1 | 26 | 28 | 34 | 43 | 565 |
| | 7 | 24 | 28 | 32 | 41 | 520 |

EXAMPLE 2

Another series of part 2s were prepared by mixing together a base as in Example 1 and adding a different hydroxyl endblocked polydimethylsiloxane fluid, having a hydroxyl content of 1.4 weight percent and a DP of about 32, in the amounts shown in Table IV. These composition were then mixed with the part 1 composition in a 1:1 ratio by weight and poured into 25 mm (1 in.) deep cups and the cure conditions determined after 24 hours with the results as shown in Table IV.

TABLE IV

| parts fluid | cure |
|---|---|
| 16 | firm rubber cure to 25 mm depth |
| 12 | part rubber, part gel to 25 mm depth |

TABLE IV-continued

| parts fluid | cure |
|---|---|
| 8 | sticky, gel-like cure to 25 mm depth |

Additional second parts were prepared by mixing 100 parts of the above base with 8, 12, and 16 part of the hydroxyl endblocked fluid having a DP of 32. This material was mixed and tested as in Example 1, with the results shown in Table V.

TABLE V

| parts fluid | Cure days | Modulus 50% kPa | Modulus 100% kPa | Modulus 300% kPa | Tensile Strength kPa | Elongation percent |
|---|---|---|---|---|---|---|
| 8 | 1 | 20 | 19 | 19 | 24 | 1853 |
|  | 7 | 48 | 54 | 65 | 100 | 1078 |
| 12 | 1 | 29 | 29 | 32 | 59 | 1610 |
|  | 7 | 67 | 74 | 88 | 146 | 1085 |
| 16 | 1 | 38 | 41 | 48 | 67 | 890 |
|  | 7 | 75 | 86 | 98 | 130 | 657 |

The ratio of moles of hydrolyzable group from the first part and the —OH from both the first part and the second part in each of the above mixtures is:

| Part 1 parts | Part 2 parts | Functional moles | —OH moles | Ratio Fun./—OH |
|---|---|---|---|---|
| 1 | 8 | 0.0333 | 0.0093 | 3.596 |
| 1 | 12 | 0.0333 | 0.0120 | 2.780 |
| 1 | 16 | 0.0333 | 0.0144 | 2.316 |

That which is claimed is:

1. A two-part composition which is stable on storage as two parts and curable at room temperature, upon mixing of the two parts, to yield a silicone elastomer, the composition comprising: Part 1, comprising a product obtained by mixing under anyhdrous conditions
   (A) 100 parts by weight of a hydroxyl endblocked polydiorganosiloxane having a viscosity at 25° C. of from 5 to 100 Pa.s and in which the organic groups are selected from the group consisting of methyl, ethyl, vinyl, phenyl, and 3,3,3-trifluoropropyl radicals, in said polydiorganosiloxane no more than 50 percent of the organic groups being phenyl or 3,3,3-trifluoropropyl radicals and no more than 10 percent of the organic groups being vinyl radicals,
   (B) from 25 to 150 parts by weight of non-acidic, non-reinforcing filler,
   (C) from 2.5 to 10 parts by weight of a silane of the general formula

in which R' is an organic radical selected form the group consisting of methyl, ethyl, and phenyl, said silane being present in an amount sufficient to provide at least one silane molecule per hydroxyl of the polydiorganosiloxane,
   (D) from 1 to 6 parts by weight of an aminoxysilicone compound having from 1 to 100 silicon atoms per molecule and from 3 to 10 aminoxy groups per molecule, said aminoxy group having a general formula —OX in which X is a monovalent amine radical selected from the group consisting of —NR$_2$ and a heterocyclic amine, R is a monovalent hydrocarbon radical, the —OX group being bonded to silicon through the SiO bond, the remaining valences of the silicon atoms in the aminoxysilicone compound being satisfied by divalent oxygen atoms which link the silicon atoms of the aminoxysilicone compounds having two or more silicon atoms per molecule through silicon-oxygen-silicon bonds and by monovalent hydrocarbon radicals and halogenated monovalent hydrocarbon radicals bonded to the silicon atoms through silicon-carbon bonds, there being an average of at least one monovalent hydrocarbon radical or halogenated monovalent hydrocarbon radical per silicon atom,
   (E) from 0 to 20 percent by weight of a diluent consisting of non-reactive silicone fluid having a viscosity of from 1 to 100 Pa.s at 25° C., and
part 2, comprising a product obtained by mixing
   (F) 100 parts of (A),
   (G) from 25 to 150 parts of (B),
   (H) from 0 to 20 percent of (E), and
   (I) sufficient hydroxyl radical endblocked polydiorganosiloxane of the formula

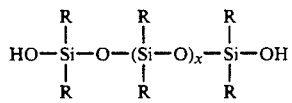

having a viscosity of less than about 0.06 Pa.s, where R is a substituted or unsubstituted monovalent hydrocarbon radical of 1 to 6 carbon atoms and x is from 1 to 50, to give from 1.1 to 3.4 moles of hydrolyzable groups in part 1 to each mole of hydroxyl groups in part 2,
and when part 1 and part 2 are combined said silane (C) and said aminoxysilicone compound (D) being present in amounts sufficient to provide a combined weight of at least 5 parts by weight per 100 parts by weight of (A), and said aminoxysilicone compound (D) being present in an amount by weight which is not greater than the weight of silane (C), said composition curing to a nonflowing gel in less than 3 hours at a temperature of 25° C.

2. The composition of claim 1 in which the hydroxyl endblocked polydiorganosiloxane (A) is a polydimethylsiloxane having a viscosity of from 40 to 60 Pa.s at 25° C.

3. The composition of claim 2 in which the filler (B) has an average particle diameter of from 1 to 8 micrometers and is treated with a treating agent selected from the group consisting of stearic acid, salts of stearic acid, and carboxylatepolybutadiene.

4. The composition of claim 3 in which the filler (B) is a calcium stearate treated calcium carbonate.

5. The composition of claim 1 in which the silane (C) is methylvinyldi-(N-methylacetamido)silane.

6. The composition of claim 1 in which the aminoxysilicone compound (D) is a copolymer having per molecule an average of two trimethylsiloxane units, five methyl(N,N-diethylaminoxy)siloxane units and three dimethylsiloxane units.

7. The composition of claim 2 in which filler (B) is a calcium stearate treated calcium carbonate, silane (C) is methylvinyldi-(N-methylacetamido)silane, and aminoxysilicone compound (D) is a copolymer having per molecule an average of two trimethylsiloxane units, five methyl(N,N-diethylaminoxy)siloxane units and three dimethylsiloxane units.

8. The composition of claim 1 in which part 1 consists essentially of 100 parts by weight of polydimethylsiloxane (A), from 60 to 100 parts by weight of calcium stearate treated calcium carbonate filler (B) having an average particle size of about 3 micrometers, from 4 to 8 parts by weight of methylvinyldi-(N-methylacetamido)silane (C), and from 2 to 4 parts by weight of aminoxysilicone compound (D) which is a copolymer having per molecule an average of two trimethylsiloxane units, five methyl(N,N-diethylaminoxy)siloxane units and three dimethylsiloxane units.

9. The composition of claim 1 in which part 2 consists essentially of 100 parts by weight of polydimethylsiloxane (A), from 60 to 100 parts by weight of calcium stearate treated calcium carbonate filler (B) having an average particle size of about 3 micrometers, and from 5 to 20 parts by weight of hydroxyl radical endblocked polydiorganosiloxane of the formula

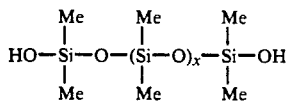

where Me is methyl radical and x is from 5 to 35.

10. The cured composition obtained by mixing 1 part by weight of part 1 and 1 part by weight of part 2 of claim 1.

11. The composition of claim 2 wherein the filler (B) has an average particle diameter of from 1 to 8 micrometers and is treated with a calcium stearate treating agent.

* * * * *